Patented Oct. 4, 1938

2,131,904

UNITED STATES PATENT OFFICE 2,131,904

STABILIZATION OF ANIMAL AND VEGETABLE FATS AND OILS

Paul L. Salzberg, Wilmington, Del., assignor to E. I. du Pont de Nemours & Company, Wilmington, Del., a corporation of Delaware No Drawing. Application November 9, 1935, Serial No. 49,038

8 Claims. (Cl. 87—12)

This invention relates to the stabilization of animal and vegetable fats and oils and, more particularly to the inhibition of the development of rancidity therein.

Many compounds are known which will prevent the development of rancidity in animal and vegetable fats and oils but practically all of them are unsuitable for use in edible fats and oils either because they are toxic or because they impart bad odor and taste to such fats and oils. Some of these prior art compounds are so volatile that they are removed from the fats and oils during cooking or in deep-fat frying operations, and others are relatively insoluble in fats and oils but are soluble in water so that they will be removed from such oils and fats during cooking operations in which they come into more or less contact with water.

An object of the present invention is to provide a new class of stabilizers for animal and vegetable fats and oils which will inhibit or retard deterioration by development of rancidity in such fats and oils. A further object is to provide stabilizers which are suitable for edible fats and oils. Other objects are to stabilize animal and vegetable fats and oils and particularly the edible fats and oils. Still further objects are to provide new compositions of matter and to advance the art. Other objects will appear hereinafter.

These objects may be accomplished in accordance with my invention which comprises incorporating in animal and vegetable fats and oils normally tending to become rancid a small amount sufficient to inhibit rancidity development therein of a polyhydric phenol having at least one hydroxyl group in at least one of the positions ortho and para to another hydroxyl group and at least one aliphatic hydrocarbon radical having a carbon chain of at least 12 carbon atoms, said phenol consisting of carbon, hydrogen and oxygen. These phenols may contain carboxyl, hydroxyl, alkoxy, or aliphatic groups besides those above specified.

By the phrase "said phenol consisting of carbon, hydrogen and oxygen", I mean that the complete compound consists of such elements and is devoid of other elements.

While the broad class of compounds mentioned hereinbefore will in general be effective for my purposes, I prefer the mononuclear phenols although polynuclear phenols, particularly those of the naphthalene and diphenyl series, may also be employed. Amongst the compounds which I have found to be particularly satisfactory for my purpose are: Dodecyl catechol and dodecyl hydroquinone.

The oils and fats which I propose to stabilize are animal and vegetable in origin and are glycerides of the more or less unsaturated higher fatty acids mixed, of course, with some saturated glycerides. Amongst the fats and oils which may be stabilized are linseed oil, China-wood oil, cod liver oil, or the highly unsaturated glycerides which, for the most part, compose them. In general, this invention is particularly directed to the stabilization of those fats and oils which have iodine numbers below 120, examples of which are castor oil, olive oil, rapeseed oil, coconut oil, palm oil, corn oil, sesame oil, peanut oil, neat's-foot oil, butter fat, lard, beef tallow, and hydrogenated oils and fats such as are sold under the trade names of "Crisco" and "Snowdrift". I do not wish to be limited to the use of my compounds in the raw oils and fats, since for certain uses, the oil or fat may be previously subjected to various treatments, such as blowing with air at more or less elevated temperatures or to simple heat treatments. My compounds and the edible oils and fats containing them can furthermore be used as ingredients in the preparation of pastries and other bakery products, potato chips, mayonaise, salad oils, and the like. They may be used alone or in combination with other materials as textile dressings, lubricants and the like. However, my compounds are particularly adapted for use in edible and medicinal oils and fats and in food products in which such oils and fats are ingredients.

The concentration in which my agents may be used will vary with the kind of oil or fat to be stabilized, the degree of stabilization desired, the particular agent and other considerations depending upon the desire of the user. The compounds will, in general, be used in concentrations of from about 0.001% to about 1.0% based on the oil or fat to be stabilized.

In order more clearly to illustrate my invention, the preferred modes of carrying the same into effect and the advantageous results to be obtained thereby, the following examples are given:

*Example 1*

A portion of refined cottonseed oil was divided into two parts. One part was retained as a blank or control and to the other was added one per cent of dodecyl catechol. Pieces of filter paper of standard size and type were saturated with the two portions of oil, blotted to remove excess oil, stored in stoppered bottles at 65° C., and examined daily for rancid odor, discoloration, etc. Results were as follows:

| Agent (1% concentration) | Discoloration produced | Hours for rancidity development |
|---|---|---|
| None (untreated oil) | None | 155 |
| Dodecyl catechol | ----do---- | 490 |

*Example 2*

Refined cottonseed oil containing one per cent of dodecyl hydroquinone was tested as in Example 1. It was found that the oil containing no antioxidant became rancid in four days at 65° C. while the oil containing dodecyl hydroquinone remained free of rancidity for 88 days. The stabilizer did not discolor or impart odor to the oil.

It should be noted that refined cottonseed oil varies considerably from lot to lot in resistance to rancidification, a fact which accounts for the considerable difference in the times required for rancidity to develop in the two blanks or controls in the above examples.

Other compounds falling within my invention which may be mentioned are di-dodecyl-catechol, di-dodecyl-hydroquinone, octa-decyl-pyrogallol, dodecyl-hydroxyhydroquinone, 1,2,3-trihydroxy 5-oleyl-benzene. Still other compounds within the scope of my invention may be prepared in which the substituent group is a radical such as the dodecyl, cetyl, tetradecyl, octadecyl, eicosyl, ceryl, myricyl, oleyl, linoleyl and the like radicals and the radicals of the coconut oil alcohols.

In general, the compounds of my invention may be prepared in accordance with the procedure disclosed in the application of E. W. Bousquet, Ser. No. 4,635, filed February 2, 1935, which comprises reacting at about 150 to about 200° C. one mol. of a saturated straight chain aliphatic alcohol of 12 or more carbon atoms with about one to two mols of a mononuclear phenol in the presence of about .01 to 5 mols of a dehydrating agent such as anhydrous zinc chloride.

Any of the other stabilizing agents above mentioned or covered by my broad disclosure may be employed in place of the agents disclosed in the examples. Mixtures of two or more of my agents may also be employed. Also, my agents may be employed in any of the oils or fats hereinbefore mentioned or in mixtures of such oils and fats or compositions containing them.

It is a characteristic of the compounds covered by this invention that they cause little or no discoloration or objectionable odor or taste of the animal and vegetable fats and oils. This feature of my compounds is especially important with respect to edible fats and oils because objectionable taste, odor or color can not be tolerated in foods. Another advantageous feature of my compounds is their low volatility which operates to reduce loss of agent during the heating of the oils or fats in cooking or in deep-fat frying operations. A third distinct advantage of my compounds is that they are, for the most part, substantially insoluble in water but soluble in the oils and fats which I wish to stabilize, so that they will not be removed from such oils and fats in cooking operations in which they come into more or less contact with water. Furthermore, their stabilizing properties are not destroyed by heat in cooking and deep-fat frying operations. It is known that the alkyl substituted polyhydric phenols in which the alkyl group contains a small number of carbon atoms are in general rather toxic.

While I have disclosed the preferred embodiments of my invention and the preferred modes of carrying the same into effect, it will be readily apparent to those skilled in the art that many variations and changes may be made therein without departing from the spirit of my invention. Accordingly, the scope of my invention is to be limited solely by the appended claims construed as broadly as is permissible in view of the prior art.

I claim:

1. Animal and vegetable fats and oils normally tending to become rancid having incorporated therein, in an amount sufficient to inhibit rancidity development, a polyhydric phenol of the benzene series having at least one hydroxyl group in at least one of the positions ortho and para to another hydroxyl group and an alkyl radical of 12 carbon atoms, said phenol consisting of carbon, hydrogen and oxygen.

2. Animal and vegetable fats and oils normally tending to become rancid having incorporated therein, in an amount sufficient to inhibit rancidity development, a susbtituted benzene having as its sole substituents two hydroxyl groups and one alkyl radical of 12 carbon atoms and in which one hydroxyl group is in one of the positions ortho and para to the other hydroxyl group.

3. Animal and vegetable fats and oils normally tending to become rancid having incorporated therein, in an amount sufficient to inhibit rancidity development, dodecyl catechol.

4. Animal and vegetable fats and oils normally tending to become rancid having incorporated therein, in an amount sufficient to inhibit rancidity development, dodecyl hydroquinone.

5. Animal and vegetable fats and oils normally tending to become rancid having incorporated therein from about 0.001 to about 1.0% of dodecyl catechol.

6. Animal and vegetable fats and oils normally tending to become rancid having incorporated therein from about 0.001 to about 1.0% of dodecyl hydroquinone.

7. Animal and vegetable fats and oils normally tending to become rancid having incorporated therein about 1% of dodecyl catechol.

8. Animal and vegetable fats and oils normally tending to become rancid having incorporated therein about 1% of dodecyl hydroquinone.

PAUL L. SALZBERG.